July 18, 1950   S. M. BUYE ET AL   2,515,334
DUMP TRUCK

Filed Sept. 25, 1948   3 Sheets-Sheet 1

INVENTORS.
Frank M. O'Rourke
and Stanley M. Buye
Tesch and Darbo  Attys.

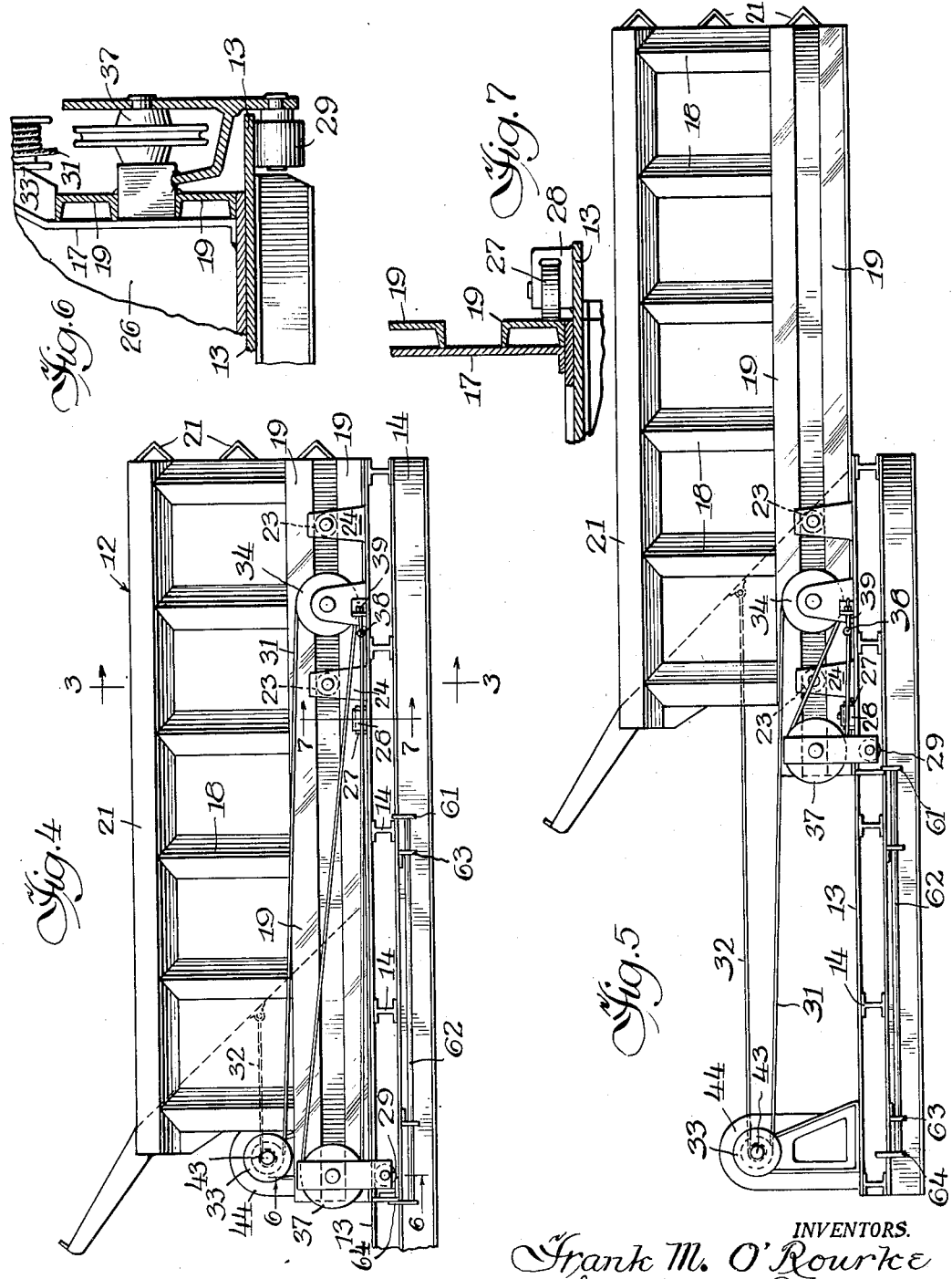

July 18, 1950  S. M. BUYE ET AL  2,515,334
DUMP TRUCK

Filed Sept. 25, 1948  3 Sheets-Sheet 3

INVENTORS
Frank M. O'Rourke
and Stanley M. Buye,
Tesch and Darby Attys.

Patented July 18, 1950

2,515,334

UNITED STATES PATENT OFFICE 2,515,334

DUMP TRUCK

Stanley M. Buye and Frank M. O'Rourke, Elroy, Wis.

Application September 25, 1948, Serial No. 51,168

8 Claims. (Cl. 214—82)

This invention relates to dump trucks. Many forms of dump trucks have been proposed in the past. In one type, which has been manufactured extensively, the body or hopper is raised at the front end to slide the contents from the open rear end of the truck. A rather complicated elevating mechanism has been required in order to raise the front end high enough to dump the load with certainty. Heavy loads, such as rock, falling from such heights do great damage to receiving hoppers or feeders. A heavy truck structure has been required because the movable body had to be strong enough to support the entire load to be dumped.

An object of the present invention is to provide a practical and dependable truck with less excess body weight. The weight of the load is carried mainly by the fixed portion of the truck. The load is dumped from the level of the load-carrying floor by sliding rearwardly the sides and front end of the body, thus sliding the load from the floor, which remains stationary. The weight of truck structure required is not much greater than would be required for a non-dumping truck. A simple but dependable mechanism is provided for moving the movable parts of the body and for supporting it in its extended position.

Another object of the present invention is to provide a practical truck from which different materials, such as gravel or limestone, may be spread evenly behind the truck as the truck moves, and to this end to provide a single truck body in which the rate of discharge is uniform and controllable without reliance on the restricted opening of a tail gate.

Additional objects and advantages of the invention will be apparent from the following description and from the accompanying drawings in which:

Fig. 4 is a side view showing particularly the dumping mechanism with the truck body in load-carrying position.

Fig. 5 is a corresponding view showing the truck body in load-dumping position.

Fig. 7 is a fragmentary sectional view taken approximately on the line 7—7 of Fig. 4.

Fig. 8 is a diagrammatic perspective view showing the dumping and return mechanism, the drive therefor, and the control means for the drive.

Figure 1:
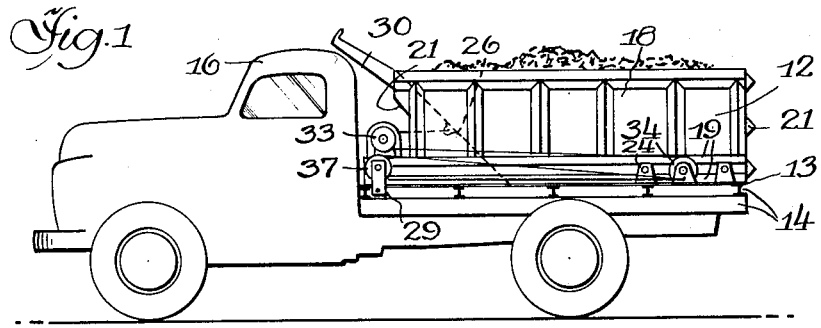
Figure 1 is a somewhat diagrammatic side view of the form of the invention chosen for illustration, showing the truck body in the load-carrying position.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

In the illustrated form of the invention, the truck includes a movable body 12 comprising upstanding sides which move along a load-carrying floor 13 which in turn is supported by a frame 14 which may comprise part of the truck chassis. The truck will generally be provided with the usual driver's cab 16 in which control mechanism for the body may be located.

The movable body 12 is preferably reenforced so as to be quite rigid. One of the features of the invention is that this movable body is strong and rigid enough to resist bulging by the load so that it may comprise the sole side walls of the truck. At the same time, it need not be so sturdy that it will alone carry the weight of the load because this is carried mainly by the immovable floor 13.

The truck side plates 17 may be reenforced by angle bars 18 and by horizontally disposed channel bars 19. The two sides of the truck body are held together by being rigidly and permanently secured to the front and back walls of the body, there being no need to swing open the back of the truck for quick dumping. These end walls may be reenforced by suitable reenforcing means such as horizontally extending angle bars 21. It will be understood that all of the parts of the movable body above mentioned may be rigidly secured together by welding.

With less complete use of the possibilities of the invention, a movable rear wall could be provided and the side walls secured to a separate transverse structure.

Figure 2:
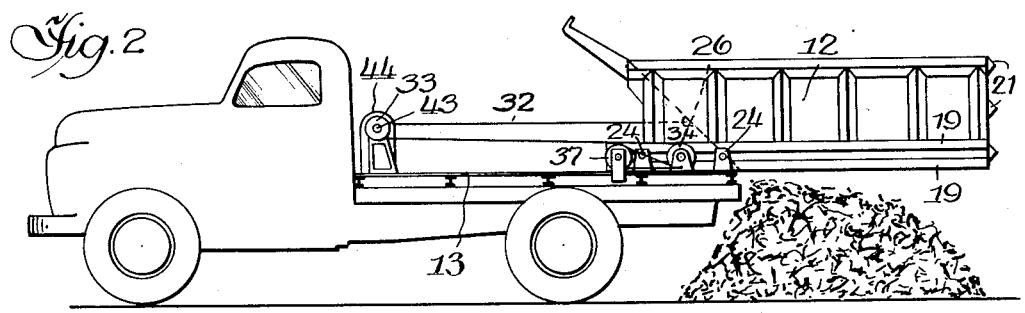
Fig. 2 is a corresponding view showing the truck body in the load-dumping position.
Figure 3:
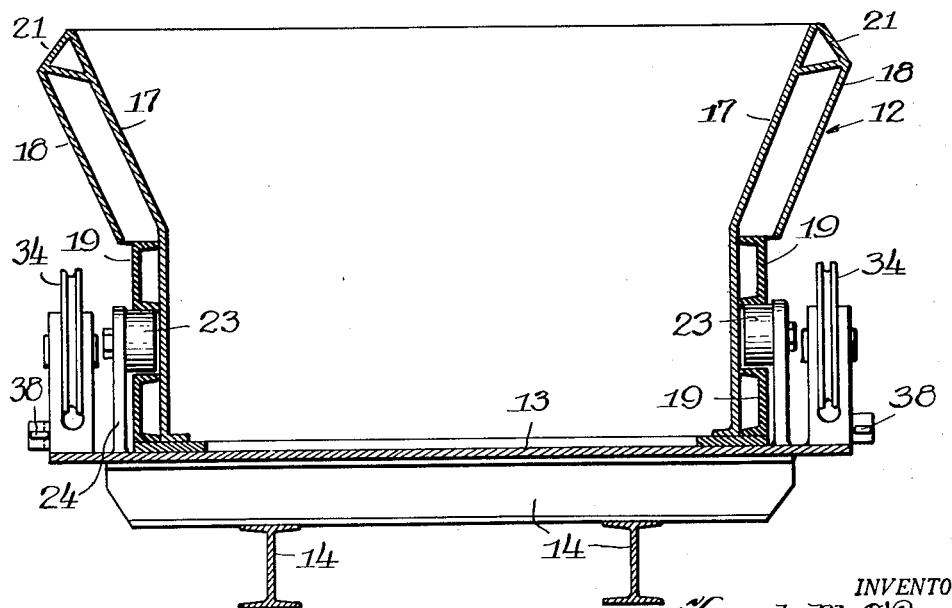
Fig. 3 is a transverse vertical sectional view through the body and the truck chassis, being taken approximately on the line 3—3 of Fig. 4.
Figure 6:
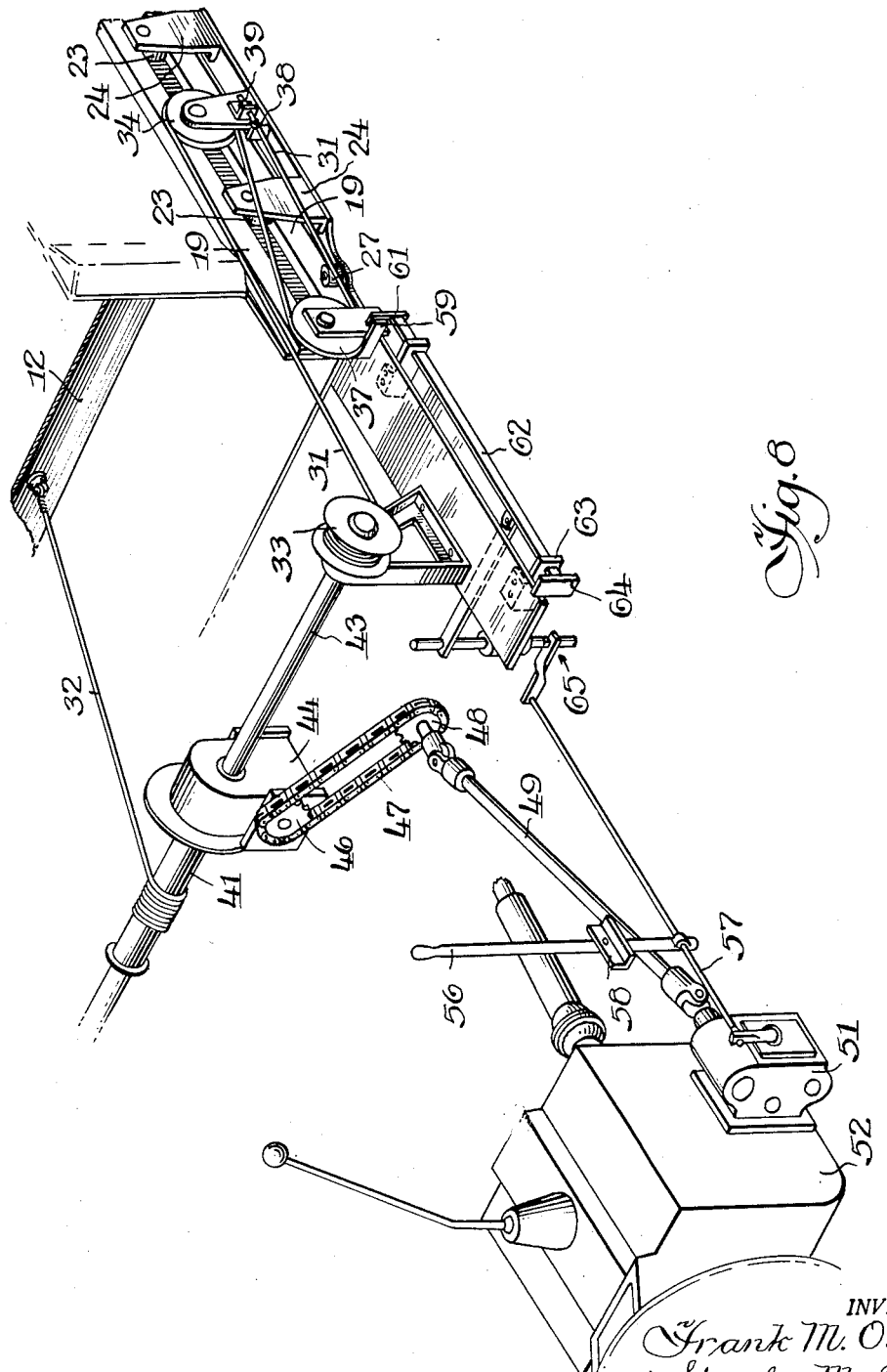
Fig. 6 is a fragmentary sectional view taken approximately on the line 6—6 of Fig. 4.

The channel bars 19 are spaced apart to form tracks which roll on rollers 23. The rollers 23 are rotatably carried by brackets 24, rolling anti-friction bearings preferably being provided. The rollers 23 are chiefly provided to avoid excessive friction when the truck body is overhanging the frame 14, as seen in Fig. 2. As the truck body 12 approaches its load-carrying position, its weight will rest more and more on the load-carrying floor 13. As a matter of fact, it is advantageous to have the bottom of front end plate 26 slide or approximately slide along the floor 13 so that it will scrape the floor fairly clean as it dumps the load.

Suitable additional rollers may be provided for ensuring reasonably smooth and easy movement of the movable body 12. Thus one or more pairs of side thrust rollers 27 may be provided. Preferably each is pivotally carried by bracket 28 mounted on the load-carrying floor 13. A pair of rollers 29 is preferably carried by the forward ends of channel members 19 to hold the forward end of the movable body 12 close to the floor 13.

A cab guard 30 forming an extension of end plate 26 has been illustrated.

Dumping mechanism

The body is moved toward the dumping position by two side cables 31 and is returned by a central cable 32. The dumping movement requires the application of much more force. Each of the cables 31, which may be of steel, is wound on a drum 33. As seen best from Fig. 8, each cable 31 extends from the drum 33 around a stationary sheave 34 rotatably carried by bracket 36. From this sheave the cable 31 extends around sheave 37 rotatably carried by the channel members 19, and back to an anchor lug 38. Preferably the cable 31 is secured by means of an adjustment device 39, so that the tension on the two side cables 31 may be equalized.

It will be apparent that the illustrated apparatus draws the body rearwardly with two strands of each cable 31, so that only half of the tension is required that would be required without the sheave 37.

The mechanical advantage resulting from the sheave 37 is not required for the return movement of the body because only the body without a load needs to be moved. Accordingly, the return cable 32 may be wound directly on drum 41. This drum 41 has a circumference half of the circumference of the drums 33 because the drums 33 must pay out cable 31 twice as fast as cable 32 is wound on drum 41.

The drums 33 and 41 are all rigidly carried by shaft 43 which is driven through a gear box 44 by a sprocket 46, chain 47, sprocket 48, drive shaft 49, and power take-off unit 51 which may be mounted on the truck's transmission case 52 through which it is connected to one of the transmission gears to be driven by the truck engine.

The gear box 44 preferably includes a worm driven by sprocket 46 and a worm gear driven by the worm. This is desirable for speed reduction, with increased available power, and also for making the gears self-locking or irreversible in the sense that no amount of force applied to a cable 31 or 32 will be able to turn the shaft 43 unless the worm is driven by sprocket 46.

It will be apparent that when the shaft 43 is driven in one direction, the drums 33 will wind cables 31 to dump the load while cable 32 is paid out. When the shaft 43 is driven in the other direction, the drum 41 will wind cable 32 to return the movable body 12 to the load-carrying position while cables 31 are paid out.

The control of the drive of shaft 43 is initially executed through hand lever 56. By swinging it forwardly from a central position, it shifts control rod 57 rearwardly, hand lever 56 being pivoted to a frame member 58. This connects the gears in power take-off unit 51 in a manner to drive shaft 43 in a direction for winding cables 31 on drums 33, thus dumping the load. As the movable body 12 approaches the limit of its rearward movement, a control arm 59 thereon strikes a projection 61 on control bar 62. This bar is slidably carried by stationary brackets 63 and is mechanically coupled to rod 57 through crank assembly 65 so as to restore the control lever 56 to neutral position and discontinue the driving of shaft 43.

When the load has been dumped, the hand lever 56 is swung rearwardly, shifting control rod 57 forwardly to engage the gears of take-off unit 51 with the opposite direction of drive, thereby driving shaft 43 in a direction to wind cable 32 on drum 41. As the movable body 12 approaches its load-carrying position, the arm 59 strikes projection 64, moving the control bar 62 forwardly and restoring hand lever 56 to the neutral position, thus disengaging the drive mechanism.

Operation

From the foregoing it is apparent that in order to dump the load from the truck, the hand lever 56 is moved in one direction to drive shaft 43 in a direction to drive cables 31 on drums 33, thus drawing the sheave 37, and with it the truck body 12, rearwardly. Inasmuch as the movable body 12 includes no floor, the front end plate 26 of the movable body slides the contents of the truck across the rear end of the truck floor 13, thus dumping the truck. The rearward movement is automatically terminated by arm 59 carried by the movable body striking projection 61 to restore the drive mechanism to neutral. The truck body is restored to load-carrying position by shifting lever 56 in the opposite direction to rotate shaft 43 in a direction to wind cable 32 on drum 41, thus drawing the movable body 12 forwardly until the arm 59 strikes the projection 64 to restore the drive mechanism to neutral.

With this truck it is easy to spread a uniform layer as in the case of spreading gravel along a road, for example. For this purpose it is merely necessary to throw the hand lever 56 in a direction to produce dumping and drive the truck forwardly at a slow uniform speed. The uniform speed at which the body is moved rearwardly along the floor, and the relatively uniform cross-section of material in a position to slide out of the truck, causes a uniform flow of the material from the truck, thus providing a layer on the road of approximately constant thickness.

Many variations may be made from the illustrated form of the invention, some making less perfect use of the invention than others. Other power take-off and drive mechanisms could be substituted. Some other mechanical advantage device could be used in place of the block and tackle arrangement. Some body-moving mechanism other than cables could be used including, for example, a fluid cylinder or a rack and pinion. The details of the body construction could be widely varied. The body could be shiftably supported in different ways. The support rollers could all be carried by the body and run on a stationary member.

What is claimed is:

1. A dump vehicle including a chassis, a load floor carried by the chassis, a movable body including upstanding opposed side walls and opposed front and back walls rigidly secured to one another and each provided with longitudinal stiffening formations to be self-sufficient in resisting spread in transporting the load, said movable body being shiftably supported in a position above the load floor to retain a load thereon, each said side wall comprising the sole side wall on its side of the truck body, and means for shifting said movable body, together with a load retained therein, along the load floor to dump the load off an edge of the load floor.

2. A dump vehicle including a chassis, a load floor carried by the chassis, a movable body shiftably positioned above the load floor and including upstanding opposed and rigidly spaced side walls and a front wall constructed to retain a load on the floor, means for sliding said movable body, together with a load retained therein, along the load floor to dump the load off the rear edge of the load floor, and pairs of spaced rollers longitudinally spaced in fixed positions on opposite sides of the body near the rear edge of said floor, and tracks on the side walls engaging the rollers for supporting the overhanging part of the body as it projects beyond the load floor in dumping the load, said body being in sliding engagement with said floor forwardly of the rollers, said tracks being positioned to engage the underside of the forward rollers as the overhanging part of the body tends to rock the body on the rear rollers.

3. A dump vehicle including a chassis, a load floor carried by the chassis, a movable body shiftably positioned above the load floor and including upstanding opposed and rigidly spaced side walls and a front wall constructed to retain a load on the floor, means for sliding said movable body, together with a load retained therein, along the load floor to dump the load off the rear edge of the load floor, and pairs of spaced rollers spaced in fixed positions on opposite sides of the body near the rear edge, and tracks on the side walls engaging the rollers for supporting the overhanging part of the body as it projects beyond the load floor in dumping the load, said body sliding on said floor forwardly of the rollers and rollers carried by said body near the front end of the body but positioned under the floor to hold the front of the body close to the floor.

4. A dump vehicle including a chassis, a load floor carried by the chassis, a movabe body shiftably positioned above the load floor and including upstanding opposed and rigidly spaced side walls and a front wall constructed to retain a load on the floor, means for sliding said movable body, together with a load retained therein, along the load floor to dump the load off an edge of the load floor, including drum surfaces, a cable wound on one drum surface for drawing the body from the extended position to the load-carrying position, and block and tackle apparatus operated by at least one drum surface for moving the body from the load-carrying position to the extended position for dumping the load, and a drive mechanism for connecting the drum means at will to be driven by the vehicle engine to produce either movement; and a control device operable by the body, as the body reaches either extreme position for disconnecting the drive mechanism from the engine.

5. A dump vehicle including a chassis a load floor carried by the chassis, a movable body shiftably positioned above the load floor and including upstanding opposed and rigidly spaced side walls and a front wall constructed to retain a load on the floor, means for sliding said movable body, together with a load retained therein, along the load floor to dump the load off an edge of the load floor, including drum surfaces, a cable wound on one drum surface for drawing the body from the extended position to the load-carrying position, cable means wound in the opposite direction on at least one drum surface rotatable in fixed relation to the first-named drum surface, and means for driving the drum surfaces jointly in either direction at will for moving the body from the load-carrying position to the extended position for dumping the load, and a drive mechanism for connecting the drum means at will to be driven by the vehicle engine to produce either movement; and a control device operable by the body as the body reaches either extreme position for disconnecting the drive mechanism from the engine.

6. A dump vehicle including a chassis, a load floor carried by the chassis, a movable body shiftably positioned above the load floor and including upstanding opposed and rigidly spaced side walls and a front wall constructed to retain a load on the floor, means for sliding said movable body, together with a load retained therein, along the load floor to dump the load off an edge of the load floor, including drum surfaces, a cable wound on one drum surface for drawing the body from the extended position to the load-carrying position, and block and tackle apparatus operated by at least one drum surface for moving the body from the load-carrying position to the extended position for dumping the load, and a drive mechanism for said drum surfaces to produce either movement, and a control device operable by the body as the body reaches either extreme position for rendering the drive mechanism inactive.

7. A dump vehicle including a chasss, a load floor carried by the chassis, a movable body shiftably positioned above the load floor and including upstanding opposed and rigidly spaced side walls and a front wall constructed to retain a load on the floor, means for sliding said movable body together with a load retained therein along the load floor to dump the load off an edge of the load floor, said means including drum surfaces, means for driving the drum surfaces jointly in either direction at will, a cable on one drum surface for drawing the body from the extended position to the load-carrying position, cable means wound on at least one drum surface in a direction to be wound as the first-named cable is unwound for moving the body from the load-carrying position to the extended position for dumping the load, and a control device operable by the body as the body reaches either extreme position for disconnecting the drive means.

8. A dump vehicle including a chassis, a load floor carried by the chassis, a movable body including upstanding opposed side walls and opposed front and back walls rigidly secured to one another and each provided with longitudinal stiffening formations to be self-sufficient in resisting spread in transporting the load, rollers on opposite sides of the load floor near the rear edge thereof for at least partially supporting the movable body in a position above the load floor to retain a load thereon, said longitudinal stiffening formations forming tracks for rolling on said rollers, each said side wall comprising the sole side wall on its side of the truck body, and means for shifting said movable body together with a load retained therein along the load floor to dump the load off the rear edge of the load floor.

STANLEY M. BUYE.
FRANK M. O'ROURKE.

REFERENCES CITED

The following references are of record in the file of this patent:

UNITED STATES PATENTS

| Number | Name | Date |
|---|---|---|
| 1,407,698 | MacLean | Feb. 28, 1922 |
| 1,432,328 | Gee | Oct. 17, 1922 |
| 2,078,332 | Le Tourneau | Apr. 27, 1937 |
| 2,089,717 | Stratton et al. | Aug. 10, 1937 |

FOREIGN PATENTS

| Number | Country | Date |
|---|---|---|
| 148,935 | Switzerland | Aug. 15, 1931 |

Certificate of Correction

Patent No. 2,515,334 July 18, 1950

STANLEY M. BUYE ET AL.

It is hereby certified that error appears in the printed specification of the above numbered patent requiring correction as follows:

Column 6, line 39, for "chasss" read *chassis*; line 49, after the word "cable" insert *wound*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*